(12) United States Patent
Asakura

(10) Patent No.: US 8,863,598 B2
(45) Date of Patent: Oct. 21, 2014

(54) ELECTRIC POWER STEERING SYSTEM

(71) Applicant: JTEKT Corporation, Osaka (JP)

(72) Inventor: Toshihiro Asakura, Chiryu (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/782,556

(22) Filed: Mar. 1, 2013

(65) Prior Publication Data

US 2013/0233103 A1 Sep. 12, 2013

(30) Foreign Application Priority Data

Mar. 9, 2012 (JP) ................................. 2012-053210

(51) Int. Cl.
| | |
|---|---|
| F16H 35/00 | (2006.01) |
| F16H 1/24 | (2006.01) |
| F16H 55/02 | (2006.01) |
| B62D 5/04 | (2006.01) |
| B62D 3/08 | (2006.01) |
| F16H 25/22 | (2006.01) |

(52) U.S. Cl.
CPC .............. B62D 3/08 (2013.01); F16H 25/2214 (2013.01); B62D 5/0448 (2013.01)
USPC .................. 74/388 PS; 74/424.82; 74/424.86

(58) Field of Classification Search
USPC ............................ 74/388 PS, 424.82, 424.86
See application file for complete search history.

(56) References Cited

U.S. PATENT DOCUMENTS

| | | | |
|---|---|---|---|
| 6,186,268 B1 * | 2/2001 | Onodera et al. | 180/444 |
| 6,629,578 B2 * | 10/2003 | Saruwatari et al. | 180/444 |
| 2003/0066372 A1 * | 4/2003 | Kobayashi et al. | 74/424.82 |
| 2004/0020317 A1 * | 2/2004 | Yamamoto | 74/388 PS |
| 2011/0296939 A1 | 12/2011 | Kaneko et al. | |

FOREIGN PATENT DOCUMENTS

JP      A-11-270647      10/1999

* cited by examiner

*Primary Examiner* — Justin Krause
(74) *Attorney, Agent, or Firm* — Oliff PLC

(57) ABSTRACT

A return passage that connects two points of a rolling passage to allow each ball that rolls in the rolling passage to endlessly circulate is formed in a ball screw nut by attaching a circulation member to fitting holes. A protrusion is formed on an outer surface of the circulation member at a position offset from a raceway of the balls that circulate in the return passage. The circulation member is fixed to the ball screw nut when the protrusion contacts an inner periphery of an inner ring of a second bearing.

4 Claims, 8 Drawing Sheets

ELECTRIC POWER STEERING SYSTEM

INCORPORATION BY REFERENCE/RELATED APPLICATION

This application claims priority to Japanese Patent Application No. 2012-053210 filed on Mar. 9, 2012 the disclosure of which, including the specification, drawings and abstract, is incorporated herein by reference in its entirety.

BACKGROUND OF THE INVENTION

1. Field of the Invention

The invention relates to an electric power steering system.

2. Discussion of Background

There is a so-called rack assist-type electric power steering system (EPS). The conventional electric power steering system includes a hollow shaft through which a rack shaft is passed and which is rotated by a motor. The electric power steering system applies assist force to a steering system by converting the rotation of the hollow shaft into an axial movement of the rack shaft with the use of a ball screw device.

Generally, such a ball screw device is formed by arranging a plurality of balls in a spiral rolling passage that is defined by a thread groove formed in the outer periphery of the rack shaft and a thread groove formed in the inner periphery of a ball screw nut, the thread grooves facing each other. The balls are held between the rack shaft and the ball screw nut in the rolling passage. When the ball screw nut rotates relative to the rack shaft, the balls roll in the rolling passage upon reception of a load (friction force) from the ball screw nut and the rack shaft. The ball screw device has a return passage that connects two points set in the rolling passage to each other. The balls roll in the rolling passage, and are returned from the point set on the downstream side to the point set on the upstream side through the return passage. In this way, the ball screw device converts the rotation of the ball screw nut into an axial movement of the rack shaft by causing the balls that roll in the rolling passage to endlessly circulate through the return passage.

There is a so-called deflector-type ball screw device in which the above-described return passage is formed by attaching a circulation member (deflector) to fitting holes that radially pass through a ball screw nut (for example, see U.S. Patent Application Publication No. 2011/296939 A1). The circulation member has the function of scooping balls from a rolling passage and the function of ejecting the balls to the rolling passage. In many cases, the circulation member is fixed to the ball screw nut by press-fitting the circulation member into the fitting holes or by using an adhesive agent.

However, when the circulation member is fixedly press-fitted into the fitting holes, the circulation member slightly deforms due to a press-fitting load. Therefore, deformation of the return passage may occur and smooth rolling of the balls may be hindered. On the other hand, when the circulation member is fixed to the fitting holes by an adhesive agent, the adhesive agent may flow into the rolling passage or the return passage and smooth rolling of the balls may be hindered. As described above, with the conventional methods of fixing the circulation member, for example, abnormal noise may be generated due to hindrance to smooth rolling of the balls.

Japanese Patent Application Publication No. 11-270647 (JP 11-270647 A) describes an EPS in which a ball screw nut is fixed to the inner periphery of a motor shaft that serves as a hollow shaft, protrusions that contact the inner periphery of the motor shaft are formed on the outer surface of a circulation member, and the motor shaft supports the circulation member via the protrusions. However, the protrusions described in JP 11-270647 A are used to suppress backlash of the circulation member due to pressing force that is applied to the circulation member from a ball that is scooped from a rolling passage or a ball that is ejected to the rolling passage, and therefore the protrusions are formed in a linear shape so as to cross a return passage, that is, so as to cross the direction in which the return passage extends. That is, the protrusions are formed at positions that overlap with the return passage when viewed in the radial direction of a ball screw nut. Therefore, if external force acts on the protrusions from the radially outer side, for example, when the ball screw nut is fitted to the motor shaft, deformation of the return passage is likely to occur.

SUMMARY OF THE INVENTION

The invention provides an electric power steering system in which balls are reliably allowed to roll smoothly.

According to a feature of an example of the invention, on an outer surface of a circulation member in which a return passage that allows balls of a ball screw nut to endlessly circulate is formed, a protrusion is formed at a position that is offset from a raceway of the balls that circulate in the return passage, and the circulation member is fixed to the ball screw nut when the protrusion contacts an inner periphery of an annular support member that is arranged on an outer periphery of the circulation member.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
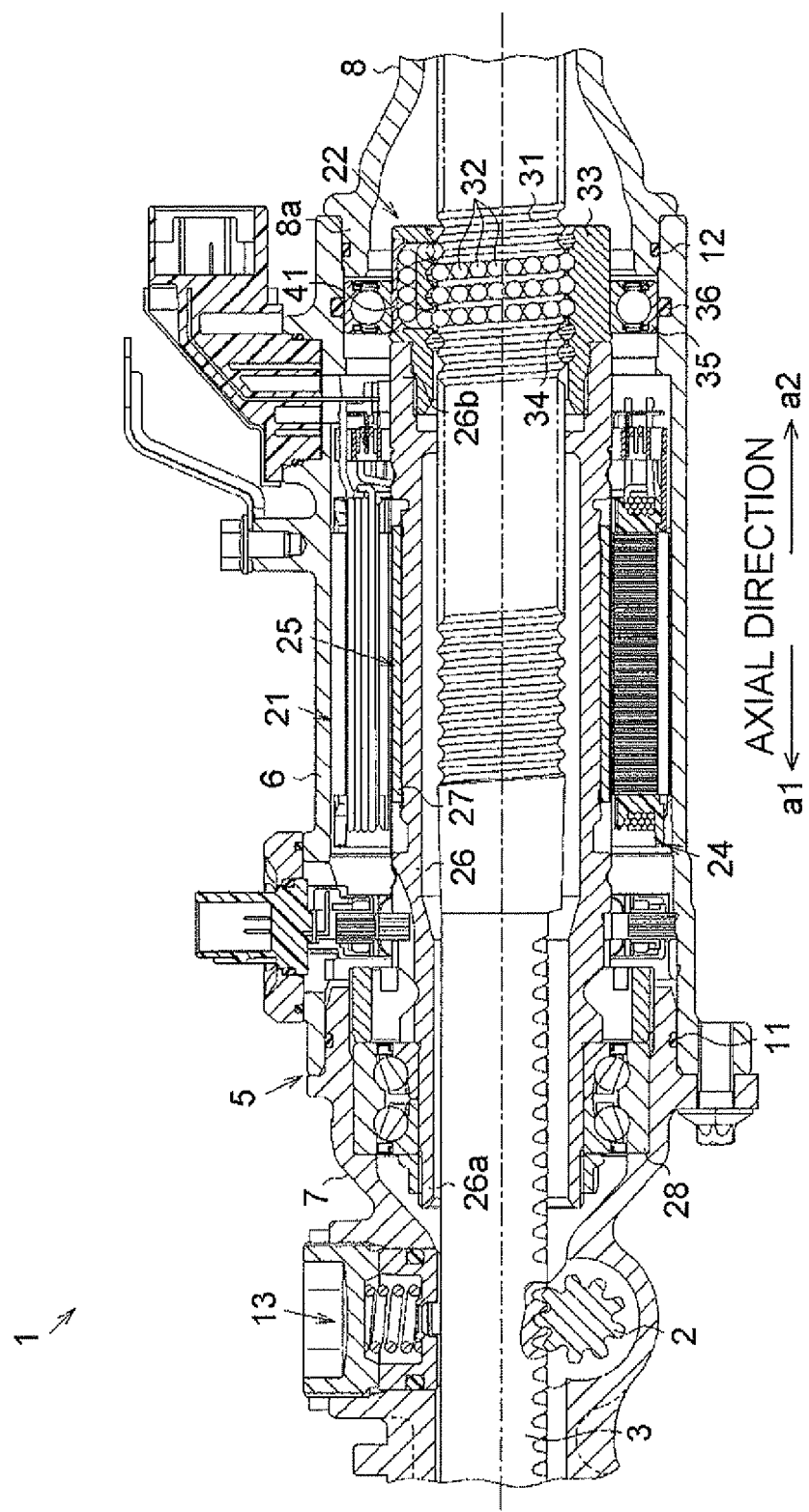
FIG. 1 is a sectional view that shows the schematic configuration of an electric power steering system according to a first embodiment of the invention.

A first embodiment will be described with reference to the drawings. As shown in FIG. 1, an electric power steering (EPS) 1 includes a pinion shaft 2 and a rack shaft 3. The pinion shaft 2 rotates in response to a steering operation. The rack shaft 3 changes the steered angle of steered wheels (not shown) through reciprocating movement of the rack shaft 3 in the axial direction (directions indicated by arrows a1, a2) in response to the rotation of the pinion shaft 2.

More specifically, the EPS 1 includes a substantially cylindrical rack housing 5, and the rack shaft 3 is passed through the rack housing 5. The rack housing 5 is formed of a center housing 6, a gear housing 7 and an end housing 8. The center housing 6 is formed in a substantially cylindrical shape. The gear housing 7 is fixed to one end side (the side indicated by the arrow a1) of the center housing 6. The end housing 8 is fixed to the other end side (the side indicated by the arrow a2) of the center housing 6. An O-ring 11 is interposed between the center housing 6 and the gear housing 7. An O-ring 12 is interposed between the center housing 6 and the end housing 8.

The rack shaft 3 is supported by a rack guide 13 and a bush (not shown) so as to be able to reciprocate in its axial direction. The rack guide 13 is provided at the gear housing 7. The bush is provided at the end housing 8. In the rack housing 5, the pinion shaft 2 is rotatably supported so as to be in mesh with the rack shaft 3, and the rack shaft 3 is urged by the rack guide 13. A steering shaft (not shown) is coupled to the pinion shaft 2, and a steering wheel (not shown) is fixed to the distal end of the steering shaft. The pinion shaft 2 rotates in response to a steering operation. The rotation of the pinion shaft 2 is converted into an axial movement of the rack shaft 3. As a result, the steered angle of the steered wheels, that is, the travel direction of a vehicle, is changed.

The EPS 1 includes a motor 21 and a ball screw device 22. The motor 21 serves as a drive source. The ball screw device 22 converts the rotation of the motor 21 into an axial movement of the rack shaft 3. That is, the EPS 1 according to the present embodiment is configured as a so-called rack assist-type EPS.

More specifically, the motor 21 is configured as a brushless motor that includes a stator 24 and a rotor 25. The stator 24 is fixed to the inner periphery of the center housing 6. The rotor 25 is rotatably provided radially inward of the stator 24. The rotor 25 includes a motor shaft 26 and a magnet 27. The motor shaft 26 serves as a hollow shaft formed in a hollow cylindrical shape. The magnet 27 is fixed to the outer periphery of the motor shaft 26. An open end 26a of the motor shaft 26 on the side indicated by the arrow a1 is rotatably supported by a first bearing 28. The rack shaft 3 is passed through the motor shaft 26. Thus, the motor 21 is arranged coaxially with the rack shaft 3. In the thus configured motor 21, the motor shaft 26 (rotor 25) is rotated by magnetic attraction force and repulsive force that are generated between a magnetic field, which is formed by driving electric power supplied to the stator 24, and the magnet 27.

The rack shaft 3 is a threaded shaft formed by forming a thread groove 31 in part of the outer periphery of the rack shaft 3. The ball screw device 22 is formed by screwing a ball screw nut 33 to the rack shaft 3 via a plurality of balls 32.

Figure 2:
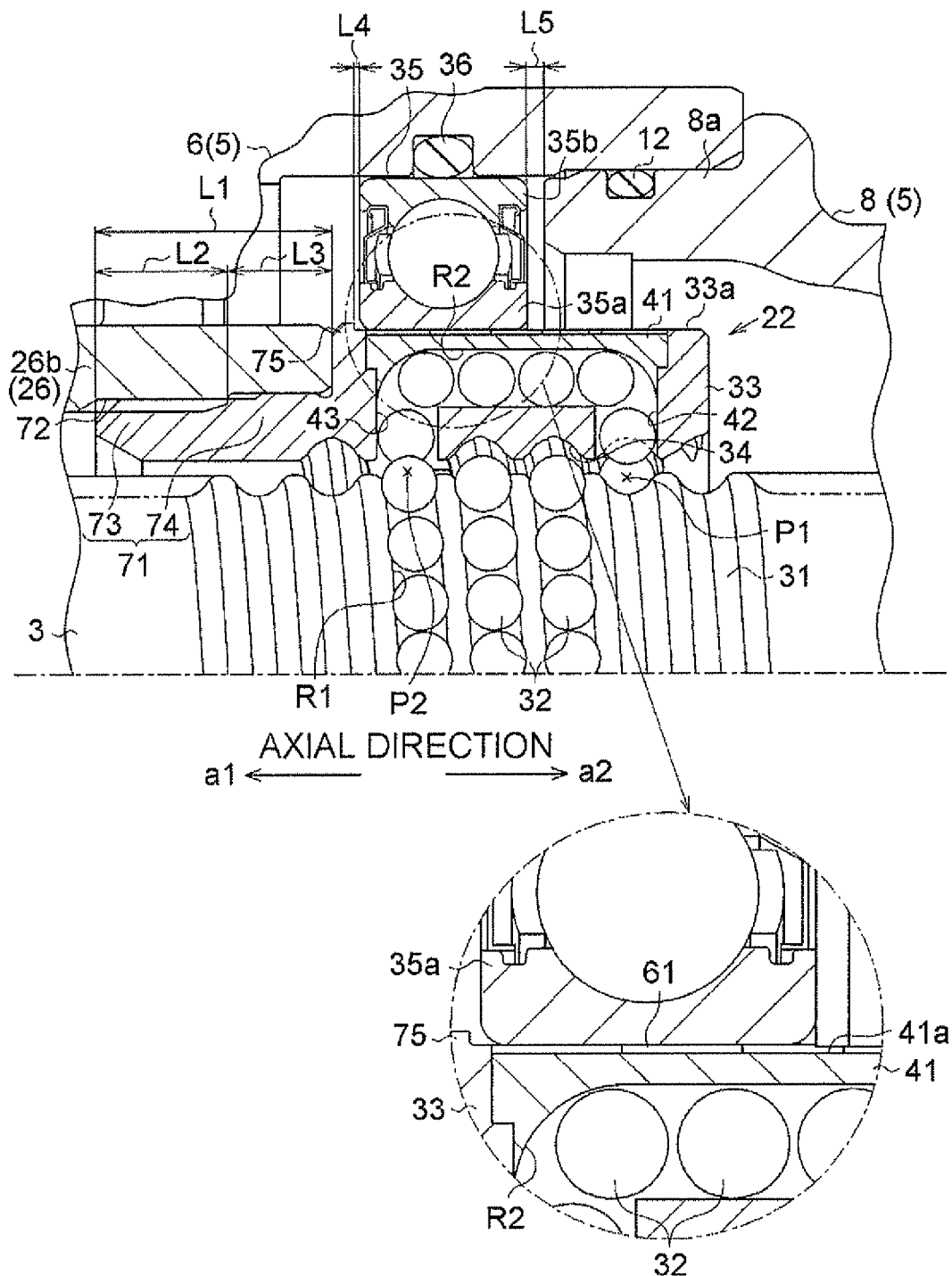
FIG. 2 is an enlarged sectional view of a ball screw device and its surroundings according to the first embodiment.

More specifically, as shown in FIG. 1 and FIG. 2, a thread groove 34 that corresponds to the thread groove 31 of the rack shaft 3 is formed in the inner periphery of the ball screw nut 33 formed in a substantially cylindrical shape. The ball screw nut 33 is fixed to an open end 26b of the motor shaft on the side indicated by the arrow a2 such that the ball screw nut 33 and the motor shaft 26 are rotatable together with each other and the thread groove 34 radially faces the thread groove 31. The ball screw nut 33 is rotatably supported by a second bearing 35 that serves as a bearing provided on the inner periphery of the center housing 6. In this way, a spiral rolling passage R1 is defined by the thread grooves 31, 34. An O-ring 36 is interposed between the second bearing 35 and the center housing 6.

The balls 32 are arranged in the rolling passage R1. Each of the balls 32 is held between the thread groove 31 of the rack shaft 3 and the thread groove 34 of the ball screw nut 33. In addition, a return passage R2 is formed in the ball screw nut 33. The return passage R2 opens at connection points P1, P2 that are set at two positions in the thread groove 34. The two connection points P1, P2 of the rolling passage R1, which correspond to the open positions of return passage R2, are connected to each other by the return passage R2.

Therefore, in the ball screw device 22, when the ball screw nut 33 rotates relative to the rack shaft 3, each ball 32 rolls in the rolling passage R1 upon reception of a load (friction force) from the rack shaft 3 and the ball screw nut 33 to transmit the torque of the ball screw nut 33 to the rack shaft 3, thereby moving the rack shaft 3 in the axial direction with respect to the ball screw nut 33. Each ball 32 that has reached one end (the connection point P1 or the connection point P2) of the rolling passage R1 after rolling in the rolling passage R1, passes through the return passage R2 formed in the ball screw nut 33, and is then ejected to the other end (the connection point P2 or the connection point P1) of the rolling passage R1. That is, each ball 32 moves from the downstream side to the upstream side, that is, each ball 32 moves from one of the two connection points P1, P2 set in the rolling passage R1 to the other one of the connection points P1, P2. That is, each ball 32 that rolls in the rolling passage R1 of the ball screw device 22 endlessly circulates through the return passage R2. Thus, the ball screw device 22 is able to convert the rotation of the ball screw nut 33 into an axial movement of the rack shaft 3. The EPS 1 is configured to apply assist force for assisting a steering operation to a steering system by rotating the ball screw nut 33 with the use of the motor 21 and then transmitting the torque of the motor 21 to the rack shaft 3 as axial pressing force.

In the ball screw device 22, the return passage R2 is formed by attaching a circulation member (deflector) 41 to the ball screw nut 33. The circulation member 41 has the function of scooping the balls 32 from the rolling passage R1 and the function of ejecting the balls 32 into the rolling passage R1. That is, the ball screw device 22 is configured as a so-called deflector-type ball screw device. The circulation member 41 according to the present embodiment is manufactured by metal injection molding, that is, the circulation member 41 is molded by injecting heated and molten metal into a molding die. The circulation member 41 is formed by assembling together members having shapes obtained by splitting the shape of the circulation member 41 into two along the direction in which the return passage R2 extends.

Figure 3:
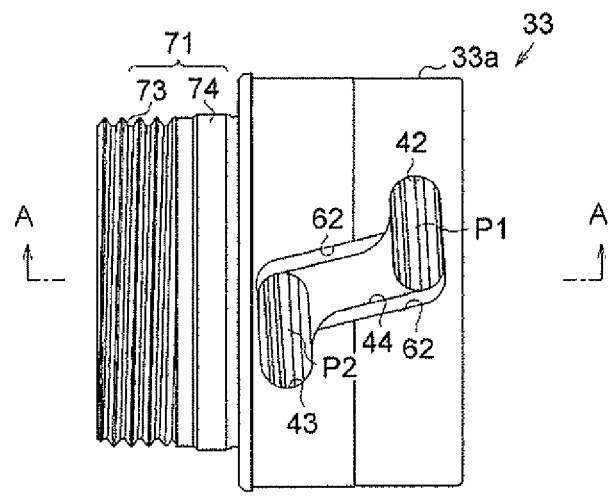
FIG. 3 is a side view of a ball screw nut according to the first embodiment.
Figure 4:
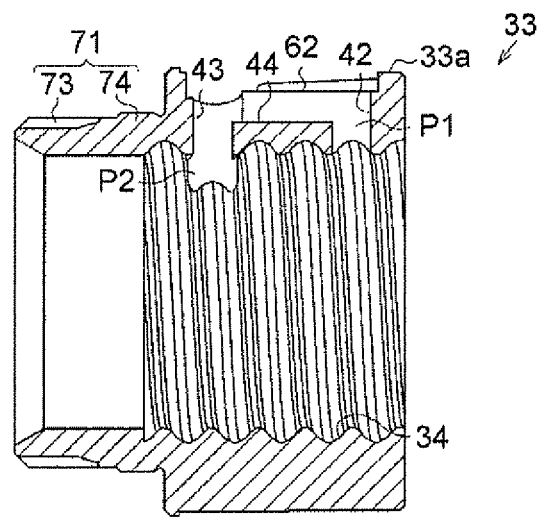
FIG. 4 is a sectional view taken along the line A-A in FIG. 3.

More specifically, as shown in FIG. 3 and FIG. 4, a pair of fitting holes 42, 43 is formed in the ball screw nut 33 at positions corresponding to the two connection points P1, P2. The fitting holes 42, 43 radially pass through the ball screw nut 33. The connection points P1, P2 are set at the positions between which a plurality of rows of the thread groove 34 is arranged in the axial direction of the ball screw nut 33. The rolling passage R1 and the return passage R2 form one circulation path (see FIG. 2). The fitting holes 42, 43 each are formed in a substantially elongated hole, and are formed at positions that are offset from each other in the circumferential direction (up-down direction in FIG. 3) of the ball screw nut 33. A groove-like fitting recess 44 is formed in an outer periphery 33a of the ball screw nut 33. The fitting recess 44 connects the fitting holes 42, 43 to each other.

As shown in FIG. 5 to FIG. 8, the circulation member 41 has a pair of insertion portions 51, 52 and a connection portion 53. The insertion portions 51, 52 are inserted in the corresponding fitting holes 42, 43. The connection portion 53 connects the insertion portions 51, 52 to each other. The circulation member 41 is point-symmetric with respect to the center of the connection portion 53 (circulation member 41) when viewed in the radial direction of the ball screw nut 33. Therefore, it is possible to insert the insertion portion 51 into the fitting hole 42 and to insert the insertion portion 52 into the fitting hole 43, and it is also possible to insert the insertion portion 51 into the fitting hole 43 and to insert the insertion portion 52 into the fitting hole 42.

Specifically, each of the insertion portions 51, 52 is formed in a substantially elongated shape that corresponds to the sectional shape of each of the fitting holes 42, 43. Insertion holes 54, 55 are formed in the insertion portions 51, 52, respectively. The insertion hole 54 is open at an insertion end (lower end in FIG. 7) 51a, extends from the insertion end 51a toward a base end (upper end in FIG. 7) while being smoothly curved, and is connected to the connection portion 53. The insertion hole 55 is open at an insertion end (lower end in FIG. 7) 52a, extends from the insertion end 52a toward a base end (upper end in FIG. 7) 52b while being smoothly curved, and is connected to the connection portion 53. Tongue portions 56, 57 are formed at the insertion ends 51a, 52a, respectively, so as to be inserted in the thread groove 31 of the rack shaft 3. The tongue portions 56, 57 are used to scoop each ball 32, which has rolled in the rolling passage R1, toward the insertion holes 54, 55, respectively.

Figure 9:
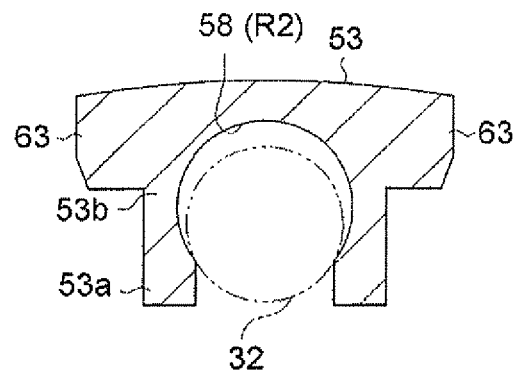
FIG. 9 is a sectional view taken along the line B-B in FIG. 6.

The connection portion 53 is formed between the insertion portions 51, 52 so as to connect the base ends 51b, 52b of the insertion portions 51, 52 to each other. The connection portion 53 is formed in a substantially rectangular shape so as to be fitted into the fitting recess 44 and to contact the inner surface of the ball screw nut 33, which defines the fitting recess 44 (see FIG. 3 and FIG. 4). As shown in FIG. 9, a connection groove 58 is formed in the connection portion 53. The connection groove 58 is open at an insertion end (lower end in FIG. 9) 53a. The connection groove 58 is formed in a substantially linear shape along an axis M of the connection portion 53, and both ends of the connection groove 58 communicate with the insertion holes 54, 55, respectively. A cross section of the connection groove 58, which is perpendicular to a direction in which the connection groove 58 extends, is formed in a circular shape with a portion on the insertion end 53a side cut out, and each ball 32 that passes through the connection groove 58 is supported by the insertion end 53a.

The thus configured circulation member 41 is attached to the ball screw nut 33 by inserting the insertion portions 51, 52 into the corresponding fitting holes 42, 43 and fitting the connection portion 53 into the fitting recess 44. The return passage R2 is formed of the insertion holes 54, 55 of the insertion portions 51, 52 and the connection groove 58 of the connection portion 53, by attaching the circulation member 41 to the ball screw nut 33.

Figure 5:
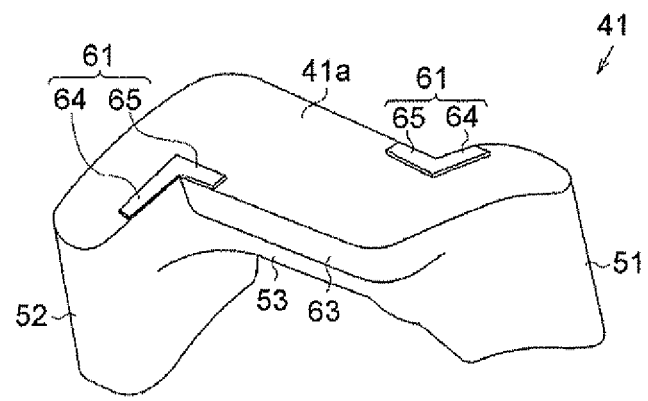
FIG. 5 is a perspective view of a circulation member according to the first embodiment.
Figure 6:
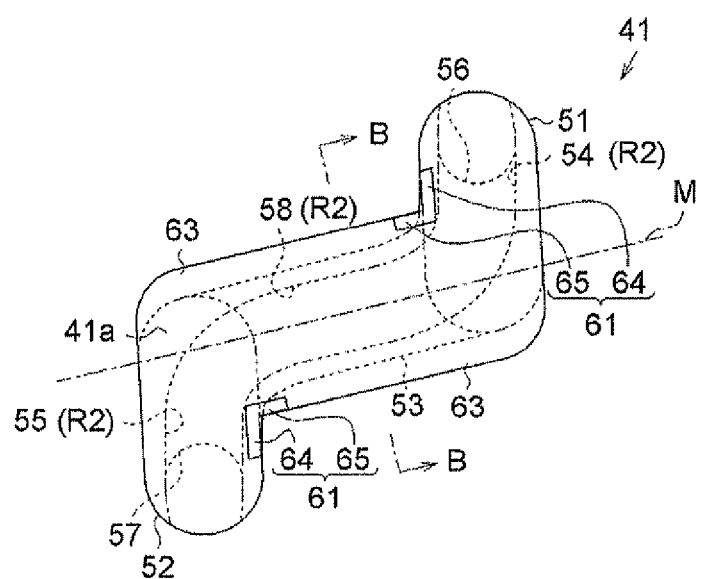
FIG. 6 is a plan view of the circulation member according to the first embodiment when viewed from a position radially outward of the ball screw nut.
Figure 7:
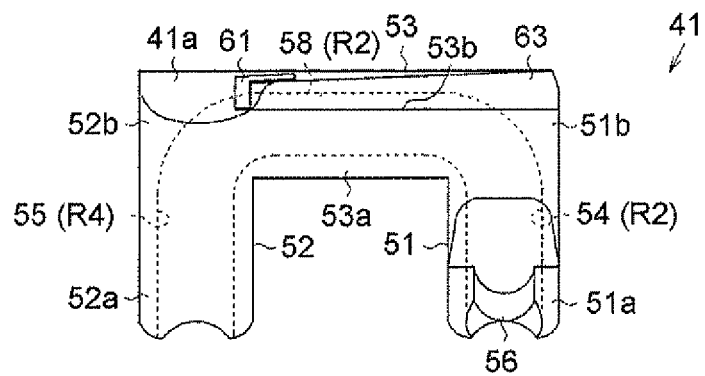
FIG. 7 is a front view of the circulation member according to the first embodiment when viewed from the circumferential direction of the ball screw nut.

As shown in FIG. 5 and FIG. 6, a plurality of protrusions 61 is formed on an outer surface 41a at positions offset from the raceway of the balls 32 that circulate in the return passage R2 when viewed in the radial direction of the ball screw nut 33, that is, positions that do not overlap with the return passage R2 when viewed from the radial direction. The outer surface 41a is an outer surface of the circulation member 41 in the radial direction of the ball screw nut 33. As shown in an enlarged view in FIG. 2, the circulation member 41 is supported by the second bearing 35 and fixed to the ball screw nut 33 when one of the protrusions 61 contacts the inner periphery of an inner ring 35a of the second bearing 35 arranged on the outer periphery of the ball screw nut 33. That is, in the present embodiment, the second bearing 35 (inner ring 35a) may function as an annular support member.

More specifically, as shown in FIG. 3 and FIG. 4, shallow grooves 62 are formed in the outer periphery 33a of the ball screw nut 33. The shallow grooves 62 communicate with the fitting recess 44 so as to surround the peripheral edge of the fitting recess 44. In addition, as shown in FIG. 5 to FIG. 8, a pair of flanges 63 is formed at a base end (upper end in FIG. 6) 53b of the connection portion 53. The flanges 63 are formed so as to correspond to the shallow grooves 62.

Figure 8:
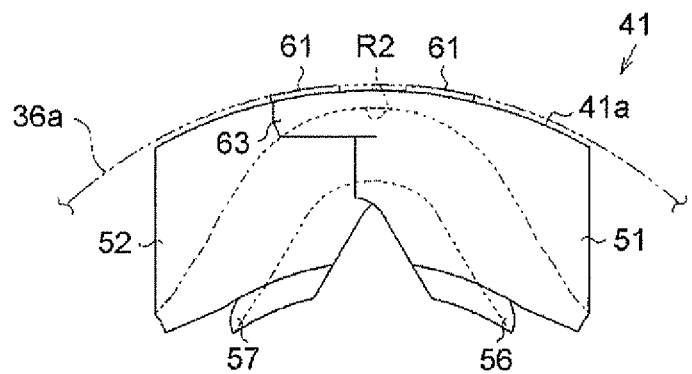
FIG. 8 is a side view of the circulation member according to the first embodiment when viewed from the axial direction of the ball screw nut.

As shown in FIG. 8, the outer surface 41a of the circulation member 41 is formed in an arc shape of which the length to the center of the ball screw nut 33 is slightly smaller than the inside diameter of the inner ring 35a when viewed in the axial direction of the ball screw nut 33. The length from the center of the ball screw nut 33 to the distal end of each protrusion 61 is equal to the inside diameter of the inner ring 35a of the second bearing 35.

As shown in FIG. 6, each protrusion 61 is formed in a substantially L-shape so as to extend over the center-side edge portion of the insertion portion 51 or 52 and a corresponding one of the flanges 63, on the outer surface 41a. Each protrusion 61 is configured to be in line contact with the second bearing 35. More specifically, a first side portion 64 of each protrusion 61, which is formed on the center-side edge portion of the insertion portion 51 or 52, is formed in a linear shape along the longitudinal direction of the insertion portion 51 or 52 when viewed in the radial direction of the ball screw nut 33. A second side portion 65 of each protrusion 61, which is formed on a corresponding one of the flanges 63, is formed in a linear shape so as to be continuous with the corresponding first side portion 64 and extend along the direction in which the connection groove 58 extends when viewed in the radial direction of the ball screw nut 33. The protrusions 61 are formed at point-symmetric positions with respect to the center of the connection portion 53 when viewed in the radial direction of the ball screw nut 33.

As shown in FIG. 2, the axial length of the second bearing 35 is smaller than the axial length of the circulation member 41, and is set to such a length that the second bearing 35 is able to contact only one of the protrusions 61. Only the protrusion 61 formed to extend over the center-side edge portion of the insertion portion 51 and the corresponding flange 63 contacts the second bearing 35. In this way, the circulation member 41 is fixed to the ball screw nut 33.

The ball screw nut 33 has an engaging portion 71. The engaging portion 71 is inserted into the motor shaft 26 through the open end 26b, and is engaged with the motor shaft 26 so as to be rotatable together with the motor shaft 26. The engaging portion 71 has a threaded portion 73 and a spigot portion 74. The threaded portion 73 is screwed into a threaded hole 72 formed in the inner periphery of the motor shaft 26, at a position axially inward of the open end 26b. The spigot portion 74 is fitted to the inner surface of the open end 26b. The ball screw nut 33 is engaged with and coupled to the motor shaft 26 through the fastening structure in which the threaded portion 73 of the engaging portion 71 is screwed into the threaded hole 72 of the motor shaft 26. The length (more specifically, the axial length) L1 of the engaging portion 71 is the length (L2+L3) obtained by adding the length L2 of the threaded portion 73 and the length L3 of the spigot portion 74.

A step portion 75 is formed in the outer periphery 33a of the ball screw nut 33. The step portion 75 is located on the side indicated by the arrow a1 with respect to the circulation member 41, and faces the inner ring 35a of the second bearing 35 in the axial direction. With this configuration, when the second bearing 35 is in contact with the step portion 75, the second bearing 35 is movable together with the ball screw nut 33 in the direction indicated by the arrow a2, that is, in such a direction that the engaging portion 71 is disengaged from the motor shaft 26. The outside diameter of the end portion of the ball screw nut 33 in the direction indicated by the arrow a1 is formed so as to be substantially equal to the inside diameter of the inner ring 35a, and the outside diameter of the end portion of the ball screw nut 33 in the direction indicated by the arrow a2 is formed so as to be slightly smaller than the inside diameter of the inner ring 35a (see FIG. 3). Therefore, it is possible to easily fit the second bearing 35 to the ball screw nut 33 from the end portion of the ball screw nut 33 in the direction indicated by the arrow a2.

The second bearing 35 is arranged with a clearance having a width L4 left between the second bearing 35 and the step portion 75 in the direction indicated by the arrow a1, and with a clearance having a width L5 left between the second bearing 35 and an end portion 8a of the end housing 8 in the direction indicated by the arrow a2. The end housing 8 may function as a restricting member. The inside diameter of the end portion 8a of the end housing 8 is set to the substantially same length as the inside diameter of an outer ring 35b of the second bearing 35. The end portion 8a of the end housing 8 contacts only the outer ring 35b of the second bearing 35. By providing the clearance between the step portion 75 of the ball screw nut 33 and the second bearing 35 and the clearance between the second bearing 35 and the end housing 8 in this way, it is possible to absorb assembly errors of the components of the electric power steering system at portions of these clearances. Therefore, the efficiency of assembling the EPS 1 is improved. The length (L4+L5) obtained by adding the width L4 of the clearance between the step portion 75 of the ball screw nut 33 and the second bearing 35 and the width L5 of the clearance between the end housing 8 and the second bearing 35 is set so as to be smaller than the length L1 of the engaging portion 71 of the ball screw nut 33.

Figure 10:
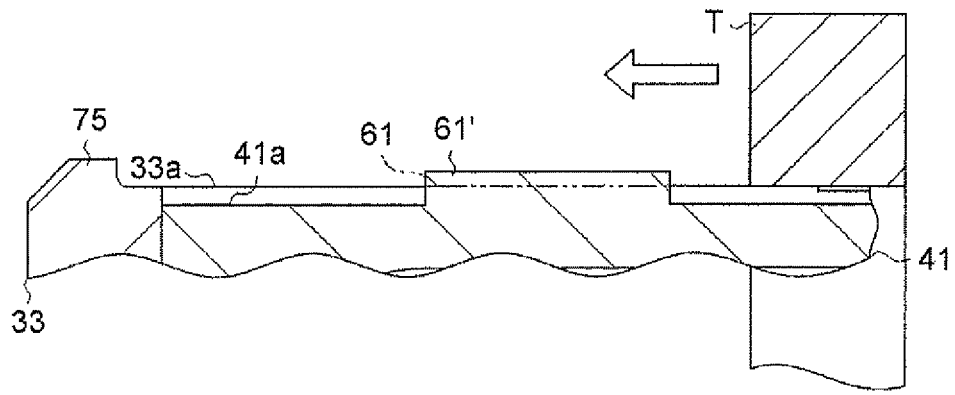
FIG. 10 is a view that illustrates a situation in which protrusions formed on the circulation member according to the first embodiment are machined.

Next, fitting of the second bearing to the ball screw nut will be described. As shown in FIG. 10, each protrusion 61' in a state where the second bearing 35 has not been fitted to the outer periphery of the ball screw nut 33 is formed such that the length from the distal end of the protrusion 61' to the center of the ball screw nut 33 is larger than the inside diameter of the inner ring 35a of the second bearing 35. Then, as shown in the drawing, after the circulation member 41 is attached to the ball screw nut 33, part of each protrusion 61 is removed with the use of an annular machining tool T having an inside diameter equal to the inside diameter of the inner ring 35a. Specifically, part of each protrusion 61 is cut by moving the ball screw nut 33, to which the circulation member 41 is attached, into the machining tool T until the step portion 75 is about to contact the machining tool T. In this way, the length from the distal end of each protrusion 61 to the center of the ball screw nut 33 is made equal to the inside diameter of the inner ring 35a of the second bearing 35. Then, by fitting the second bearing 35 to the outer periphery of the ball screw nut 33 and arranging the second bearing 35 at the portion, to which the circulation member 41 is attached, to bring one of the protrusions 61 into contact with the inner periphery of the inner ring 35a, the circulation member 41 is fixed to the ball screw nut 33.

Figure 11:
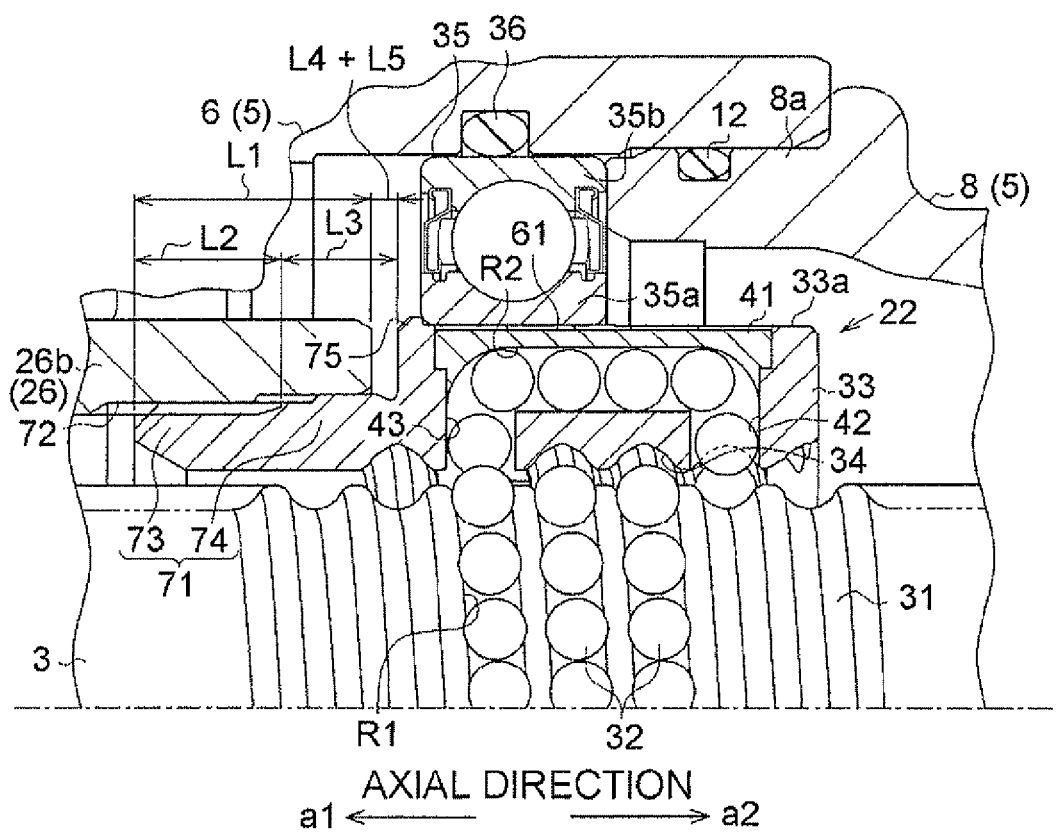
FIG. 11 is a sectional view that shows an example of the operation of the electric power steering system according to the first embodiment.

Next, the operation of the EPS according to the present embodiment will be described. For example, when one of the steered wheels of the vehicle collides with a curb, an excessive impact load acts on the rack shaft 3. As a result, the ball screw nut 33 may move relative to the motor shaft 26 in the direction indicated by the arrow a2 (in such a direction that the engaging portion 71 is disengaged from the motor shaft 26). In this case, when the ball screw nut 33 moves in the direction indicated by the arrow a2, the second bearing 35 is pressed in the direction indicated by the arrow a2 by the step portion 75 of the ball screw nut 33. Then, as shown in FIG. 11, when the second bearing 35 contacts the end portion 8a of the end housing 8, further movement of the second bearing 35 is restricted. Therefore, the distance over which the ball screw nut 33 is able to move relative to the motor shaft 26 is the length (L4+L5) obtained by adding the width L4 of the clearance between the step portion 75 of the ball screw nut 33 and the second bearing 35 and the width L5 of the clearance between the end housing 8 and the second bearing 35, which are shown in FIG. 2. In the present embodiment, because the length L1 of the engaging portion 71 of the ball screw nut 33 is set larger than the length (L4+L5) obtained by adding the width L4 and the width L5, the engaging portion 71 of the ball screw nut 33 does not slip out of the motor shaft 26. Thus, even when an impact load acts on the rack shaft 3, it is possible to maintain connection between the ball screw nut 33 and the motor shaft 26. Therefore, it is possible to appropriately apply assist force from the motor shaft 26 to the rack shaft 3. In addition, with this configuration, it is not necessary to provide a swaging structure (for example, see U.S. Patent Application Publication No. 2011/296939 A1) between the ball screw nut 33 and the motor shaft 26. Therefore, it is possible to reduce the number of man-hours for manufacturing the power steering system. Furthermore, when the ball screw nut 33 moves in the direction indicated by the arrow a2, the end portion 8a of the end housing 8 contacts only the outer ring 35b of the second bearing 35. Therefore, the rotation of the inner ring 35a of the second bearing 35 is not hindered.

As described above, according to the present embodiment, the following advantageous effects are obtained.

(1) The protrusions 61 are formed on the outer surface 41a of the circulation member 41 at positions offset from the raceway of the balls 32 that circulate in the return passage R2 when viewed in the radial direction of the ball screw nut 33, and the circulation member 41 is fixed to the ball screw nut 33 when one of the protrusions 61 contacts the inner periphery of the inner ring 35a. With the above-described configuration, the circulation member 41 is supported by the second bearing 35 and fixed to the ball screw nut 33 when one of the protrusions 61 contacts the inner periphery of the inner ring 35a. Therefore, it is possible to prevent deformation of the return passage R2 due to deformation of the circulation member 41, which may occur in the case where the circulation member is press-fitted, and to prevent leakage of an adhesive agent into the rolling passage R1 or the return passage R2, which may occur in the case where an adhesive agent is used. The protrusions 61 are formed at positions offset from the raceway of the balls 32 that circulate in the return passage R2 when viewed in the radial direction. Therefore, even if external force acts on the protrusions 61 from the radially outer side, for example, when the inner ring 35a of the second bearing 35 is fitted to the ball screw nut 33, deformation of the return passage R2 is less likely to occur. As a result, it is possible to reliably allow the balls 32 to roll smoothly, and it is possible to suppress, for example, generation of abnormal noise.

(2) The end portion 8a of the end housing 8 is arranged so as to face the second bearing 35 such that the distance over which the ball screw nut 33 is able to move relative to the motor shaft 26 in the axial direction is shorter than the length L1 of the engaging portion 71 of the ball screw nut 33. Thus, even when an impact load acts on the rack shaft 3, it is possible to prevent the engaging portion 71 of the ball screw nut 33 from slipping out of the motor shaft 26 with a simple configuration. By fixing the circulation member 41 to the ball screw nut 33 with the use of the second bearing 35 that retains the ball screw nut 33 in this way, it is possible to simplify the configuration of the EPS 1 by making the number of components smaller than that in the case where the inner ring 35a of the second bearing 35 is separately provided.

(3) A single-row rolling bearing may be employed as the second bearing 35. As described above, the circulation member 41 is formed such that the length from the center of the ball screw nut 33 to the distal end of each protrusion 61 is equal to the inside diameter of the inner ring 35a. Therefore, careful work is required to fit the second bearing 35 to the outer periphery of the ball screw nut 33. If the axial length of the second bearing 35 is large, the efficiency of fitting the second bearing 35 to the ball screw nut 33 decreases. Thus, as in the above-described configuration, the second bearing 35 is formed of a single-row rolling bearing, and the axial length of the second bearing is reduced. In this way, it is possible to improve the efficiency of fitting the second bearing 35 to the ball screw nut 33.

(4) The insertion portions 51, 52 of the circulation member 41 each are formed to be able to be inserted into to either of the fitting holes 42, 43 of the ball screw nut 33, and the protrusions 61 are formed at point-symmetric positions with respect to the center of the connection portion 53. Therefore, regardless of whether the insertion portions 51, 52 are inserted into the fitting holes 42, 43, respectively, or the insertion portions 51, 52 are inserted into the fitting holes 43, 42, respectively, in order to attach the circulation member 41 to the ball screw nut 33, one of the protrusions 61 contacts the inner ring 35a of the second bearing 35. Thus, it is not necessary to insert each of the insertion portions 51, 52 to a predetermined one of the insertion holes 54, 55 in order to attach the circulation member 41 to the ball screw nut 33. Therefore, it is possible to improve the efficiency of fitting the circulation member 41 to the ball screw nut 33.

(5) Each protrusion 61 is formed so as to be in line contact with the inner periphery of the inner ring 35a of the second bearing 35. Therefore, in comparison with the case where each protrusion 61 is formed so as to be in point contact with the inner periphery of the inner ring 35a of the second bearing 35, it is possible to more stably fix the circulation member 41 to the ball screw nut 33.

Next, a second example embodiment of the invention will be described with reference to the drawings. For ease of description, the same components as those in the first embodiment will be denoted by the same reference numerals as those in the first embodiment, and the description thereof will be omitted.

Figure 12:
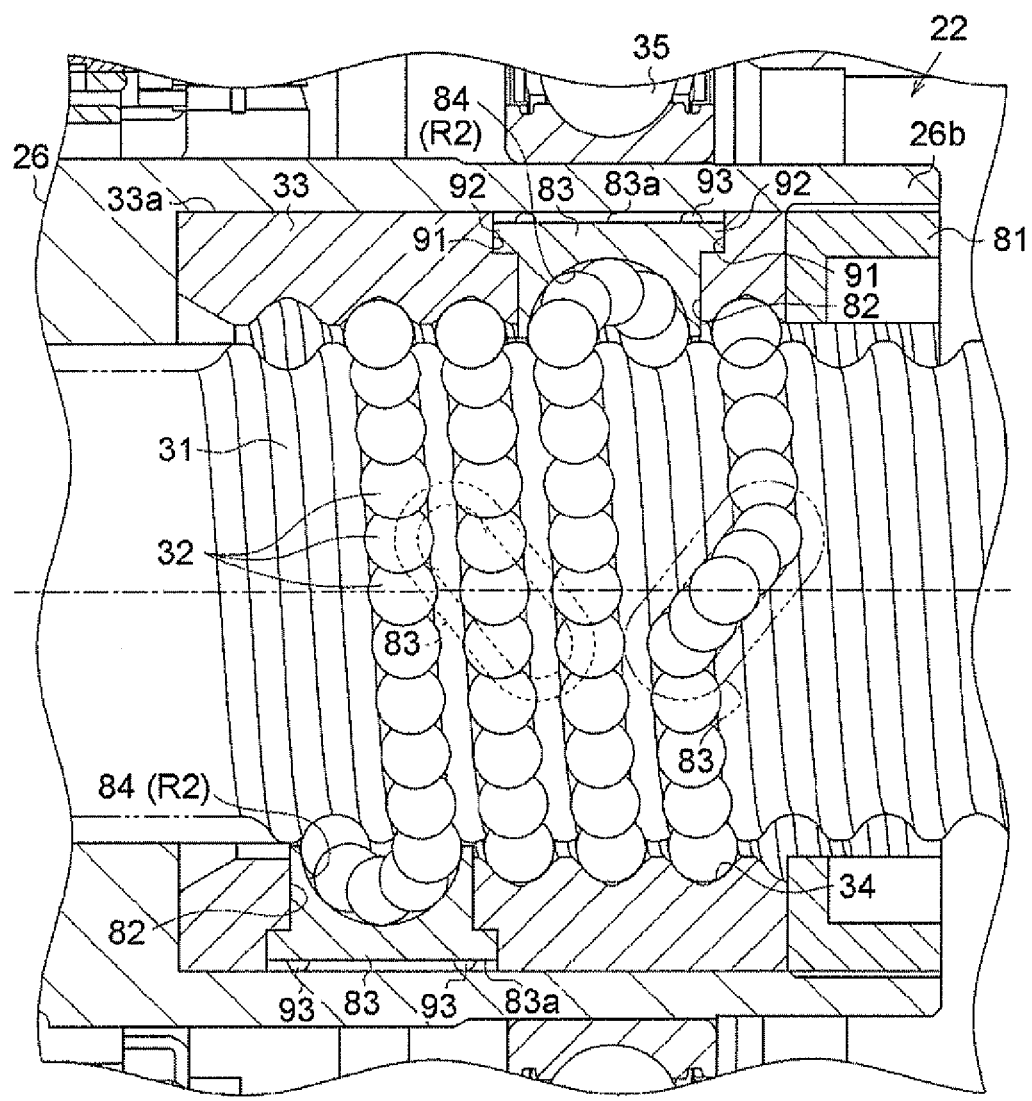
FIG. 12 is an enlarged sectional view of a ball screw device and its surroundings according to a second embodiment of the invention.

As shown in FIG. 12, the ball screw nut 33 according to the present embodiment is inserted in the motor shaft 26, and is fixed by a lock nut 81 fixed to the open end 26b. A plurality of (four in the present embodiment) fitting holes 82 is formed in the ball screw nut 33, and a plurality of independent circulation paths is formed by attaching circulation members 83 to the respective fitting holes 82.

Figure 13:
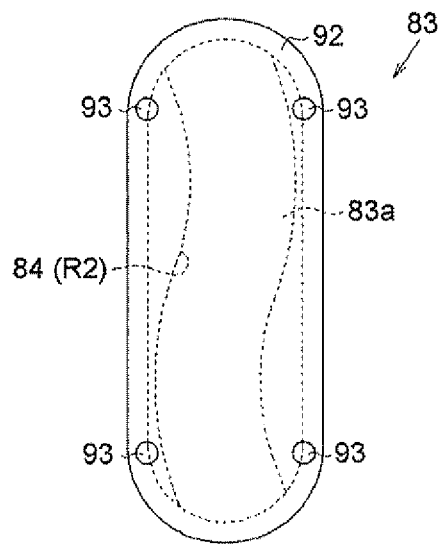
FIG. 13 is a plan view of each circulation member according to the second embodiment when viewed from a position radially outward of a ball screw nut.

More specifically, the fitting holes 82 are formed at positions that are offset from each other by 90° along the spiral shape of the thread groove 34, that is, positions that are offset from each other at equal intervals in the axial direction and circumferential direction of the ball screw nut 33. Each of the fitting holes 82 is formed in an elongated hole such that two adjacent rows of the thread groove 34 are partially cut out in the circumferential direction. Each circulation member 83 is formed in a substantially elongated shape in cross section, which corresponds to the sectional shape of each fitting hole 82, and a passage 84 through which the balls 32 are allowed to pass is formed in each circulation member 83. As shown in FIG. 13, each passage 84 is formed in a curved shape in order to smoothly connect one end and the other end of the rolling passage R1, which are formed parallel to each other, when viewed in the radial direction of the ball screw nut 33, and is formed in a substantially S-shape in which the curved direction is changed at the center of the passage 84. When each circulation member 83 is attached to the corresponding fitting hole 82, the ends of the passage 84 respectively open into the adjacent two rows of the thread groove 34. Thus, the balls 32 that roll in the rolling passage R1 are scooped from an upstream open portion of the passage 84 into the passage 84, and are ejected from a downstream open portion of the passage 84 to the rolling passage R1. That is, the return passage R2 is formed of the passage 84 of each circulation member 83. Then, the balls 32 are returned to the upstream side by approximately one turn in each of the circulation paths due to relative rotation between the ball screw nut 33 and the rack shaft 3, and endlessly circulate in the corresponding one of the circulation paths.

As shown in FIG. 12, shallow grooves 91 are formed in the outer periphery 33a of the ball screw nut 33, and each communicate with a corresponding one of the fitting holes 82 so as to surround the periphery of the fitting hole 82. In addition, a flange 92 is formed at each circulation member 83. The flange 92 is fitted into the shallow groove 91. An outer surface 83a of each circulation member 83 is curved such that the length from the outer surface 83a to the center of the ball screw nut 33 is slightly smaller than the inside diameter of the open end 26b of the motor shaft 26. As shown in FIG. 13, protrusions 93 are formed in a substantially semispherical shape, and are respectively formed on the outer surface 83a of the circulation member 83 at positions offset from the raceway of the balls 32 that circulate in the return passage R2 when viewed in the radial direction of the ball screw nut 33. The protrusions 93 are formed at point-symmetric positions with respect to the center of the circulation member 83. Then, the circulation member 83 is supported by the motor shaft 26 and fixed to the ball screw nut 33 when the protrusions 93 contact the inner periphery of the motor shaft 26. That is, in the present embodiment, the motor shaft 26 may function as an annular support member.

As in the first embodiment, the ball screw nut 33 is fitted to the motor shaft 26 as follows. First, in a state where the circulation members 83 are attached to the ball screw nut 33, part of each protrusion 93 is removed with the use of the machining tool T. In this way, the length from the distal end of each protrusion 93 to the center of the ball screw nut 33 is made equal to the inside diameter of the open end 26b. After that, by inserting the ball screw nut 33 into the motor shaft 26 and bringing the protrusions 93 into contact with the inner periphery of the open end 26b, the circulation members 83 are fixed to the ball screw nut 33.

As described above, according to the present embodiment, operation and advantageous effects similar to (1) and (4) of the first embodiment are obtained. The above-described embodiments may be modified as follows.

Figure 14:
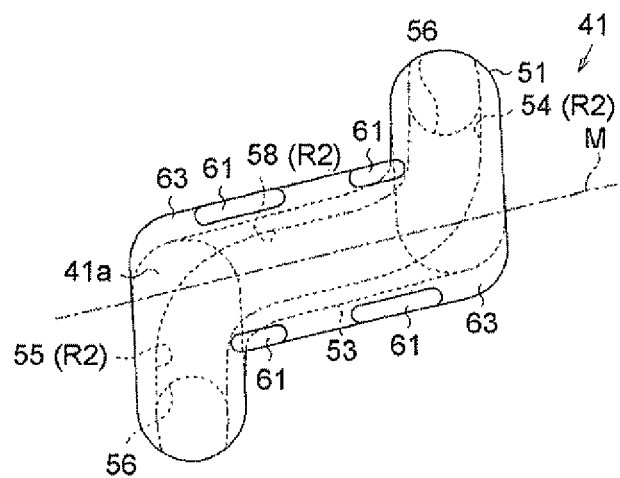
FIG. 14 is a plan view of a circulation member according to an alternative embodiment when viewed from a position radially outward of a ball screw nut.

In the above-described first embodiment, the L-shaped protrusions 61 are formed on the outer surface 41a of the circulation member 41. However, the invention is not limited to this configuration. For example, as shown in FIG. 14, a plurality of linear protrusions 61 may be formed on each flange 63 along the direction in which the connection groove 58 extends. In short, the protrusions 61 just need to be formed at positions offset from the raceway of the balls 32 that circulate in the return passage R2 when viewed in the radial direction of the ball screw nut 33, and each protrusion 61 may be modified as needed into a linear protrusion or curved protrusion that is in line contact with the inner periphery of the inner ring 35a, a semispherical protrusion that is in point contact with the inner periphery of the inner ring 35a, or the like. Similarly, in the above-described second embodiment, the shape of each protrusion 93 may be changed as needed.

For example, a double-row rolling bearing, or the like, may be employed as the second bearing 35 instead of a single-row rolling bearing.

In the above-described first embodiment, the engaging portion 71 of the ball screw nut 33 is screwed to the motor shaft 26. However, the invention is not limited to this configuration. For example, a tolerance ring may be interposed between the engaging portion 71 of the ball screw nut 33 and the open end 26b of the motor shaft 26, and the ball screw nut 33 may be engaged with and coupled to the motor shaft 26 by friction resistance based on the elastic force of the tolerance ring.

In the above-described first embodiment, the end housing 8 is used as a member that restricts movement of the second bearing 35 in the direction indicated by the arrow a2. However, the invention is not limited to this configuration. For example, a restricting member that axially faces the second bearing 35 may be fixed to the inner periphery of the center housing 6, and movement of the second bearing 35 in the direction indicated by the arrow a2 may be restricted by the restricting member.

In the above-described embodiments, the protrusions 61 or 93 are formed at point-symmetric positions on the corresponding circulation member 41 or 83 when viewed in the radial direction of the ball screw nut 33. Alternatively, the protrusions 61 or 93 may be formed at non-point-symmetric positions. For example, in the above-described first embodiment, only the protrusion 61 formed to extend over the center-side edge portion of the insertion portion 51 and the corresponding flange 63 may be formed on the circulation member 41.

In the above-described embodiments, the invention is applied to the rack assist-type EPS 1 in which the motor 21 and the motor shaft 26, which serves as a hollow shaft, are arranged coaxially with the rack shaft 3. However, the systems to which the invention is applied are not limited to the rack assist-type EPS. The invention may be applied to an EPS where a hollow shaft through which a rack shaft is passed is driven by a motor provided outside of a housing, such as a so-called rack cross type EPS and a so-called rack parallel type EPS.

What is claimed is:

1. An electric power steering system that includes a rack shaft provided so as to be able to reciprocate in an axial direction of the rack shaft, a hollow shaft through which the rack shaft is passed and that is rotated by a motor, and a ball screw device that converts rotation of the hollow shaft into an axial movement of the rack shaft, characterized in that:

the ball screw device is formed by arranging a plurality of balls in a spiral rolling passage that is defined by a thread groove formed in an outer periphery of the rack shaft and a thread groove formed in an inner periphery of a ball screw nut that rotates together with the hollow shaft, the thread groove of the rack shaft and the thread groove of the ball screw nut facing each other;

a return passage that connects two points of the rolling passage to each other to allow each of the balls that roll in the rolling passage to endlessly circulate is formed in the ball screw nut by attaching a circulation member to a fitting hole that passes through the ball screw nut in a radial direction of the ball screw nut;

a protrusion is formed on an outer surface of the circulation member at a position offset from a raceway of the balls that circulate in the return passage when viewed in the radial direction of the ball screw nut;

the circulation member is fixed to the ball screw nut when the protrusion contacts an inner periphery of an annular support member that is arranged on an outer periphery of the circulation member; and the protrusion extends outwardly in the radial direction from an outer surface of the circulation member.

2. The electric power steering system according to claim 1, wherein:

the ball screw nut is provided with an engaging portion that engages with the hollow shaft;

there is provided a restricting member that restricts a distance over which the ball screw nut is allowed to move relative to the hollow shaft in such a direction that the engaging portion is disengaged from the hollow shaft, to a predetermined distance, a length of the engaging portion being set larger than the predetermined distance;

there is provided a bearing that is arranged on an outer periphery of the ball screw nut and that is arranged so as to be movable together with the ball screw nut in such a direction that the engaging portion is disengaged from the hollow shaft;

the restricting member is arranged so as to face the bearing with a predetermined clearance in such a direction that the engaging portion is disengaged from the hollow shaft; and the annular support member is formed of the bearing.

3. The electric power steering system according to claim 2, wherein the bearing is a single-row rolling bearing.

4. The electric power steering system according to claim 1, wherein the annular support member is a bearing.

* * * * *